United States Patent
Welsh et al.

(10) Patent No.: US 7,118,328 B2
(45) Date of Patent: Oct. 10, 2006

(54) GEARBOX MOUNTED FORCE GENERATOR

(75) Inventors: William A. Welsh, North Haven, CT (US); Erez Eller, Oakville, CT (US); Robert K. Goodman, West Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 185 days.

(21) Appl. No.: 10/799,982

(22) Filed: Mar. 12, 2004

(65) Prior Publication Data
US 2005/0201863 A1 Sep. 15, 2005

(51) Int. Cl.
*F03B 11/00* (2006.01)

(52) U.S. Cl. .................. 415/170 R; 244/17.27

(58) Field of Classification Search ............ 416/169 R, 416/170 R, 500; 415/119; 244/17.27, 60; 74/573 R, 572, 574, 603, 604; 464/180
See application file for complete search history.

(56) References Cited

U.S. PATENT DOCUMENTS

| | | | |
|---|---|---|---|
| 3,372,758 A | 3/1968 | Jenney | |
| 3,540,809 A | 11/1970 | Paul et al. | |
| 5,005,439 A | 4/1991 | Jensen et al. | |
| 5,347,884 A | 9/1994 | Garnjost et al. | |
| 5,853,144 A | 12/1998 | Vincent | |
| 5,906,254 A | 5/1999 | Schmidt et al. | |
| 6,416,016 B1 * | 7/2002 | Welsh | 244/54 |
| 6,431,530 B1 | 8/2002 | Stamps et al. | |
| 6,480,609 B1 * | 11/2002 | Strehlow et al. | 381/71.1 |

OTHER PUBLICATIONS

Oldrich Mikus, Nejat Olgac, Rifat Sipahi, "An Actively Controlled Harmonic Force Generator," University of Connecticut Mechanical Engineering Department, pp. 1-30.

* cited by examiner

*Primary Examiner*—Edward K. Look
*Assistant Examiner*—Devin Hanan
(74) *Attorney, Agent, or Firm*—Carlson, Gaskey & Olds

(57) ABSTRACT

An active vibration control (AVC) system includes a shaft-driven gearbox mounted force generator (GMFG) mounted to a main rotor transmission. The GMFGs receive shaft power from an output shaft driven by the main rotor transmission and/or engine-to-transmission gearbox to avoid separate drive motors.

26 Claims, 5 Drawing Sheets

GEARBOX MOUNTED FORCE GENERATOR

BACKGROUND OF THE INVENTION

The present invention relates to producing large, controllable, vibratory forces to compensate for sensed noise or vibrations, and more particularly to an active vibration control (AVC) system which is driven by an aircraft gearbox.

The dominant source of vibration in a helicopter is that generated by the main rotor system rotating at the blade passing frequency. Forces and moments are transmitted usually through the transmission via airframe attachments, to produce vibration in the airframe.

One conventional approach to reducing such vibration involves replacing a rigid gearbox mounting strut with a compliant strut and parallel hydraulic actuator. These actuator strut concepts "intercept" the main gearbox vibration before entry into the airframe or generate counteracting loads that partially suppress the vibration or loads. Interrupting a load path may disadvantageously permit relatively large motions between the main gearbox and the airframe. Interruption of the load path between the gearbox and the airframe may cause fatigue failures in high speed drive shafts that transmit shaft power from the vehicle engines to the main gearbox. Compliant mounts may permit the gearbox to vibrate at higher levels than desirable which may then be transmitted to the driving engines reducing their service life. Furthermore, unwanted motions may also induce unexpected control inputs by effectively deflecting the mechanical flight control system links.

Another conventional approach utilizes counter-rotating eccentric masses located within the airframe to rotate at the frequency of the primary aircraft vibration and generate a fixed magnitude vibration force. A second pair of eccentric masses phased relative to the first pair to yield a force magnitude from zero to maximum force. A control computer commands the masses such that the inertial forces are produced to minimize airframe vibrations. Although effective, this approach may be inadequate in a vehicle having a gearbox which is directly attached to the airframe.

Conventional actively controlled force generators are electrically driven by an electric motor. The electric motor and ancillary equipment are relatively heavy and require considerable electrical power. Due to their size and drive requirements, conventional actively controlled force generators are positioned within the relatively flexible airframe remote from the vibration source of the rotor assembly. This arrangement permits vibration to enter the flexible airframe and may limit effectiveness by requiring a large number of actuators to achieve significant vibration suppression. Reduction to vibration levels of 0.05 g are essentially unattainable with such conventional force generators.

Accordingly, it is desirable to provide an active vibration control system which generates relatively large controllable vibratory forces with a lower weight and smaller size than conventional systems.

SUMMARY OF THE INVENTION

The active vibration control (AVC) system according to the present invention is mounted adjacent a helicopter gearbox and is powered thereby. The AVC system includes a shaft-driven gearbox mounted force generator (GMFG) mounted to the main rotor transmission. The GMFGs receive shaft power from an output shaft driven by the main rotor transmission and/or engine-to-transmission gearbox and do not require separate drive motors to provide the drive torque.

Each GMFG is driven by a powered output shaft. The output shaft drives a pair of bevel gears which drive mirror image sections of the GMFG. Each bevel gear drives a differential assembly which drives a first and second mass gear which each support a mass. The first mass gear and the second mass gear are counter-rotated to create a vibratory force in one direction. The differential assemblies provides for selective relative rotation between the GFMG sections. The rotational difference between the sections provides a variation in magnitude between zero (180 degrees out of phase) to the maximum vibratory force (in phase). The absolute phase of the net force arising from the entire GMFG is varied relative the powered output shaft to achieve a desired vibratory force output in both phase and magnitude.

Another GMFG according to the present invention replaces the differential assemblies with clutch assemblies such as magnetorheological clutches. The clutch assemblies are selectively released or engaged in response to a processor in response to changing dynamic characteristics such that vibratory forces caused by the rotor assembly and/or other vibratory sources are reduced or eliminated.

The present invention therefore provides an active vibration control system which generates relatively large controllable vibratory forces with a lower weight and smaller size than conventional systems.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
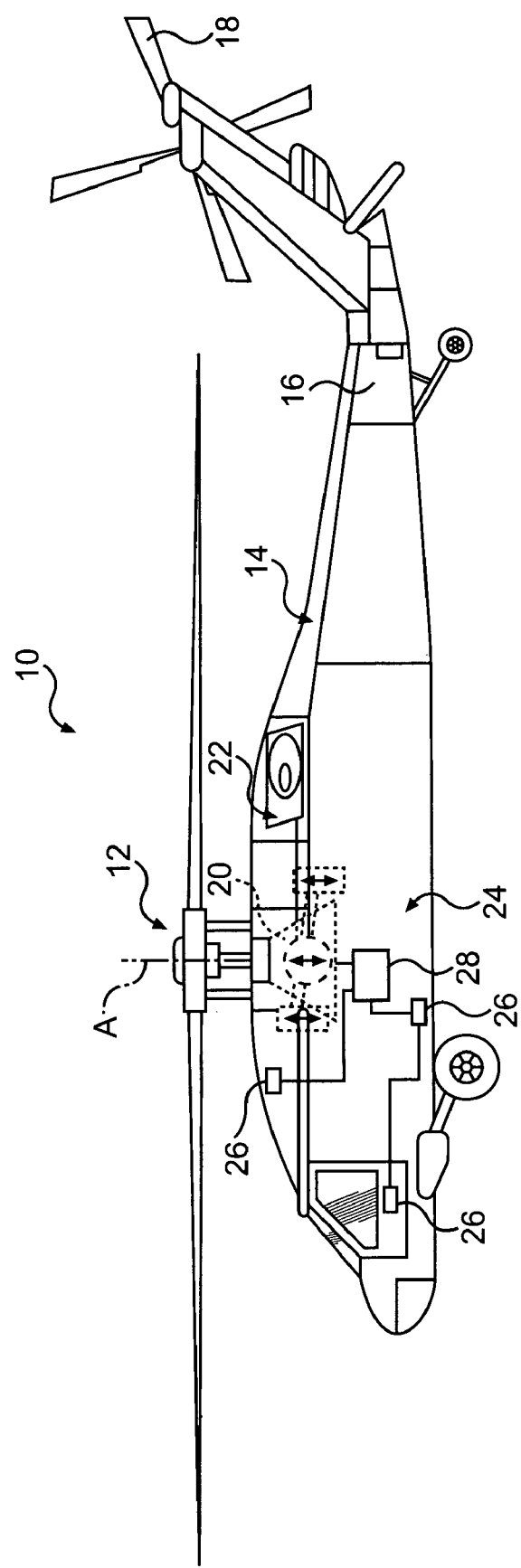
FIG. 1 is a general perspective view an exemplary rotary wing aircraft embodiment for use with the present invention.

FIG. 1 schematically illustrates a rotary wing aircraft 10 having a main rotor assembly 12. The aircraft 10 includes an airframe 14 having an extending tail 16 which mounts an anti-torque rotor 18. Although a particular helicopter configuration is illustrated in the disclosed embodiment, other machines such as turbo-props and tilt-wing aircraft will also benefit from the present invention.

The main rotor assembly 12 is driven through a main rotor transmission (illustrated schematically at 20) by one or more engines 22. Vibrations from the rotating main rotor assembly 12, gearbox 20, and the engines 22 are thus transmitted to the helicopter airframe 14. This vibration transmission may be particularly manifested in rigid mounted gearbox systems.

An active vibration control (AVC) system 24 is mounted adjacent the gearbox 20 and is powered thereby. It should be understood that numerous locations within the aircraft 10 which also provide drive to the AVC system 24 will likewise benefit from the present invention. This arrangement prevents vibrations from entering the relatively flexible airframe 14 and reduces vibrations to vibration levels below approximately 0.05 g.

A plurality of sensors 26 are mounted at various locations and communicate with a processor 28. The sensors 26 are preferably mounted in the cockpit or cabin areas adjacent crew or passenger stations. The sensors 26 are preferably accelerometers which generate signals representative of dynamic changes at selected locations as the main rotor assembly 12 rotates. The processor 28 generates output signals to control the AVC system 24 to minimize and low frequency noise within the airframe.

In operation, the main rotor assembly 12 produces vibratory forces. Such vibratory forces arising as the main rotor assembly 12 rotates are, in the absence of any compensating systems, transmitted from the rotor 12 to the airframe 14. Operation of the AVC system 24 is continuously varied by the processor 28 to cater to changing dynamic characteristics such that vibratory forces caused by the rotor assembly 12 and/or other vibratory sources are reduced or eliminated.

Figure 2:
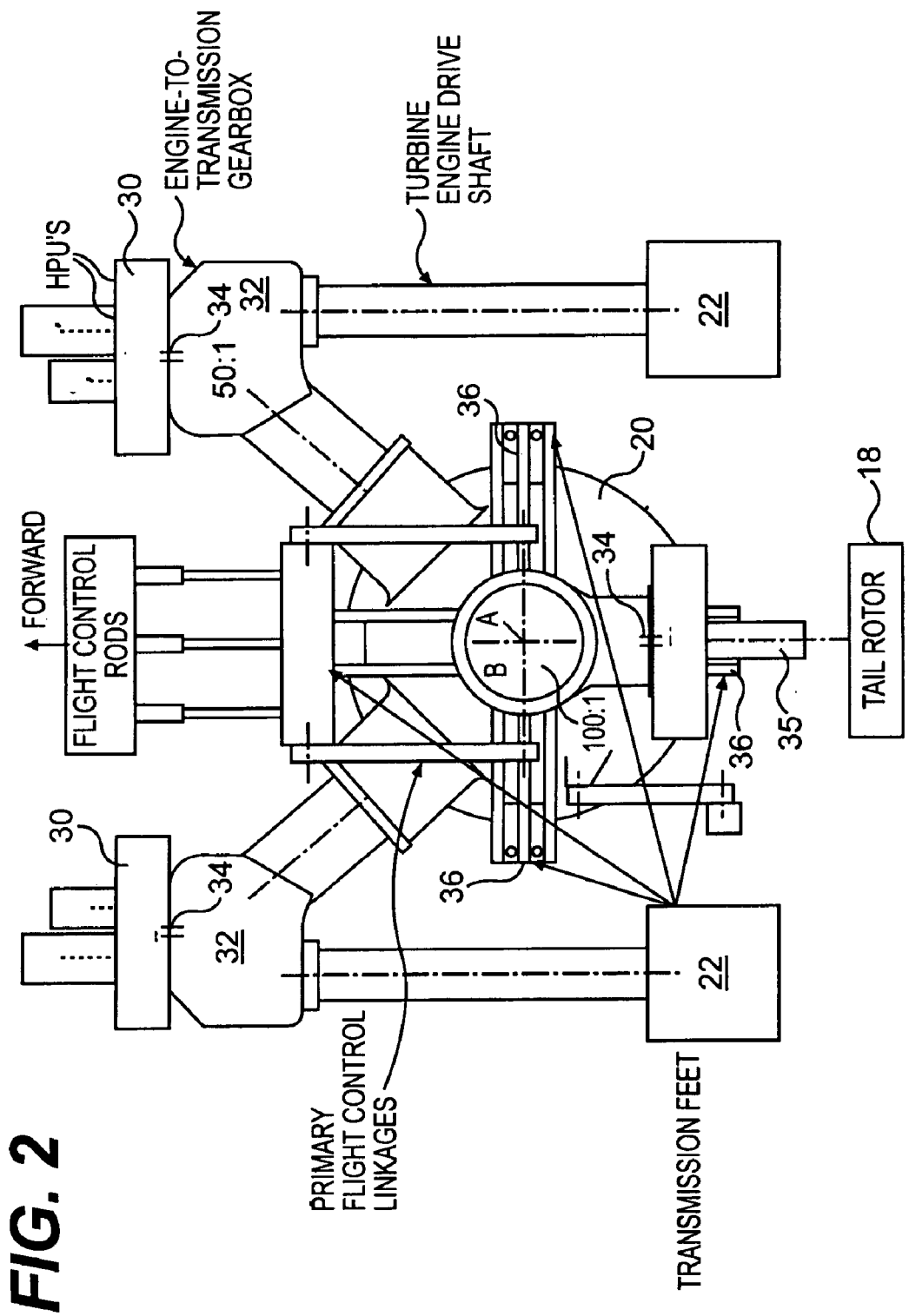
FIG. 2 is a general face view of an active vibration control system according to the present invention.

Referring to FIG. 2, the AVC system 24 includes a shaft-driven gearbox mounted force generator (GMFG) 30 mounted to the main rotor transmission 20. Preferably, each engine 22 drives the main rotor transmission 20 though an engine-to-transmission gearbox 32 flanking the transmission 20. The engine-to-transmission gearbox 32 reduces the rotational speed and increases the torque from the engine 22 prior to the final rotational speed reduction and torque increases by the main rotor transmission 20.

The GMFGs 30 receive shaft power from an output shaft 34 (illustrated schematically) driven by the main rotor transmission 20 and/or engine-to-transmission gearbox 32 and do not require separate drive motors to provide the drive torque. It should be understood that the GMFGs 30 may alternatively or additionally be mounted on the main rotor transmission 20 adjacent to other devices requiring shaft power like generators and/or hydraulic pumps or be integrated with ancillary equipment such electrical generators and or hydraulic pumps to further save weight.

Figure 3:
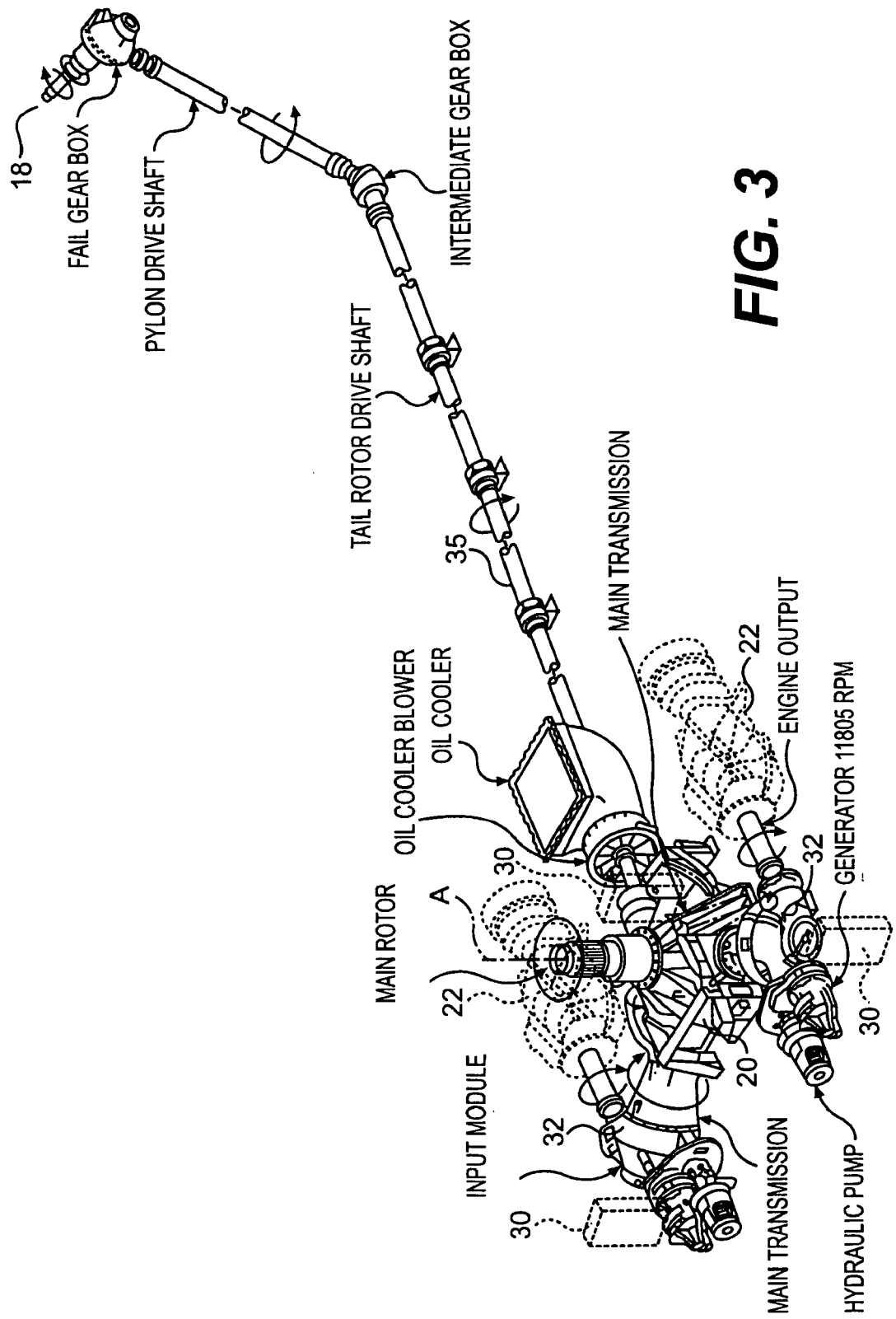
FIG. 3 is a general face view of an active vibration control system according to the present invention.

The main rotor transmission 20 is relatively rigidly mounted to the airframe 14 through struts 36. Multiple GMFGs 30 (three shown) may be oriented at various locations relative the transmission on the main rotor transmission 20. Preferably, six GMFGs 30 (three shown) are utilized to suppress the six vibratory hub forces applied to the main rotor transmission 20 by the main rotor 12 which rotates about axis A. Since the main rotor transmission 20 is relatively rigid compared to the airframe 14, it moves in six degrees of freedom and six GMFGs 30 are required for each degree of freedom. The six GMFGs 30 will potentially eliminate vibration transmitted through the main rotor transmission 20 thus achieve extremely low vibration levels. As the GFMGs 30 are shaft driven, one GFMG 30 is preferably driven by each engine-to-transmission gearbox 32 and one GFMG 30 is driven by the tail rotor driveshaft output 35 from the main rotor transmission 20 (also illustrated in FIG. 3).

Figure 4:
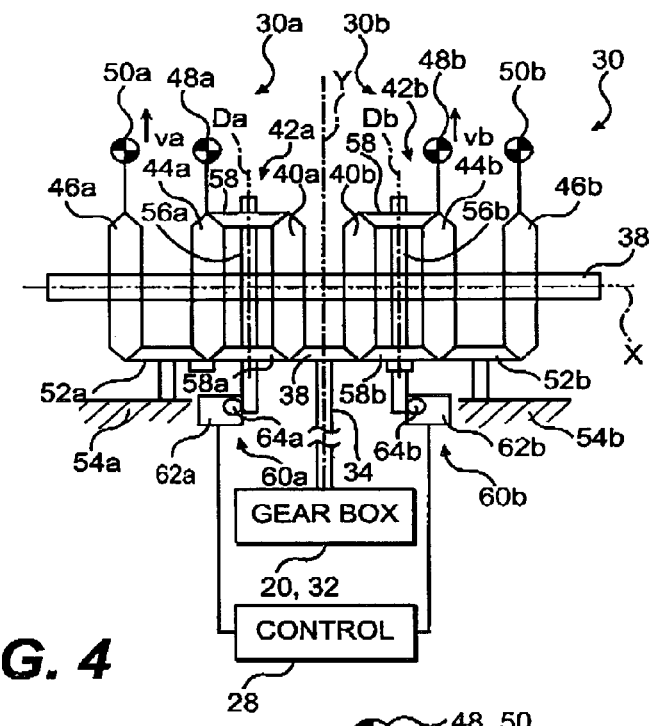
FIG. 4 is a general face view of an active vibration control system according to the present invention.

Referring to FIG. 4, one GMFG 30 is schematically illustrated. A primary gear shaft 38 defines a first axis X about which a multiple of gears rotate. The GMFG 30 is driven by the powered output shaft 34 and pinion 38 which are located along an axis Y generally transverse to axis X.

Alternatively or in addition, the primary gear shaft 38 may be driven directly. In some applications, a more compact packaging arrangement may thereby be achieved. In such an application, shaft 34 is free-wheeling.

The output shaft 34 drives a pair of bevel gears 40a, 40b which drive mirror image sections 30a, 30b of the GMFG 30. As the sections 30a, 30b are mirror images, section 30a will be generally described, however, such description applies to the opposite section 30b with gear rotations reversed (mirrored).

The bevel gear 40a drives a differential assembly 42a which drives a first and second mass gear 44a, 46a which each support a mass 48a, 50a. The first mass gear 44a and the second mass gear 46a are engaged with an intermediate gear 52a mounted to a fixed structure 54a. The first mass gear 44a rotates the intermediate gear 52a which drives the second mass gear 46a. The first mass gear 44a and the second mass gear 46a are thereby counter-rotated.

This counter-rotation creates a vibratory force in one direction. Here, the vibratory direction is illustrated by arrow $v_a$.

The differential assemblies 42a, 42b provides for selective relative rotation between the sections 30a, 30b. That is, differential assembly 42a, 42b selectively advances or retards, the first mass gear 44a, 44b and the second mass gear 46a, 46b relative the output shaft 34. The differential assembly 42a, 42b advances or retards the phase of the mass gears 44a, 46a on section 30a relative the mass gears 44b, 46b on section 30b. The relative difference between the sections 30a, 30b thereby provide a variation in magnitude between zero (180 degrees out of phase) to the maximum vibratory force (in phase).

Furthermore, as the differential assembly 42a on section 30a, is controlled independently of differential assembly 42b on the opposite section 30b, each section 30a, 30b can generate a vibratory force of a desired phase and magnitude. That is, the vibratory force generated by section 30a can reinforce or cancel the forces generated by section 30b and vice versa. In addition, the absolute phase of the net force arising from the entire GMFG 30 can be varied relative the powered output shaft 34 to achieve a desired vibratory force output in both phase and magnitude.

The differential assembly 42a includes a differential shaft 56 which mounts a multiple of differential gears 58 for rotation thereabout. The differential shafts 56a, 56b define an axis Da, Db and are mounted transverse to the primary gear shaft 38. Each differential gear 58a, 58b engage the first mass gear 44a, 44b and associated bevel gear 40a, 40b respectively. An actuator 60 such as a motor 62 and a worm gear 64 engages the differential shaft 56 to selectively rotate the differential shaft 56 about axis X (FIG. 5).

That is, the shaft 56 is clocked about axis X to provide a differential rotation and differential vibratory force from sections 30a, 30b.

Figure 5:
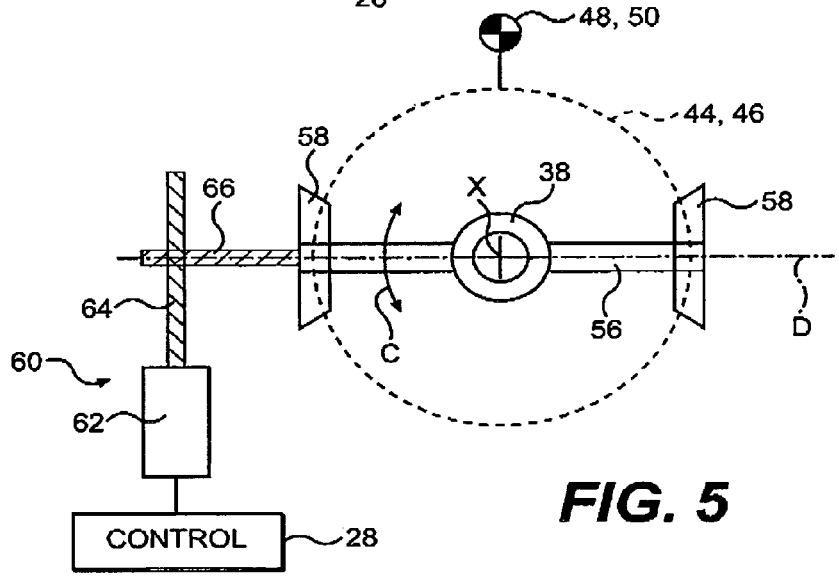
FIG. 5 is a general face view of an active vibration control system according to the present invention.

Referring to FIG. 5, the worm gear 64 engages complimentary threads 66 extending from the differential shaft 56. Rotation of the worm gear 64 selectively clocks the differential shaft about axis X (illustrated schematically by arrow C). It should be understood that other actuators to clock the differential shaft 56 will likewise benefit from the present invention. Clocking of the differential shaft 56 selectively generates a rotational difference between the mass gears 44a, 46a of section 30a, relative the mass gears 44b, 46b of section 30b to provide differential vibratory forces from each section 30a, 30b.

The actuator 60 is preferably controlled in response to the processor 28 (FIG. 1) in response to changing dynamic characteristics such that vibratory forces caused by the rotor assembly 12 and/or other vibratory sources are reduced or eliminated.

Figure 6:
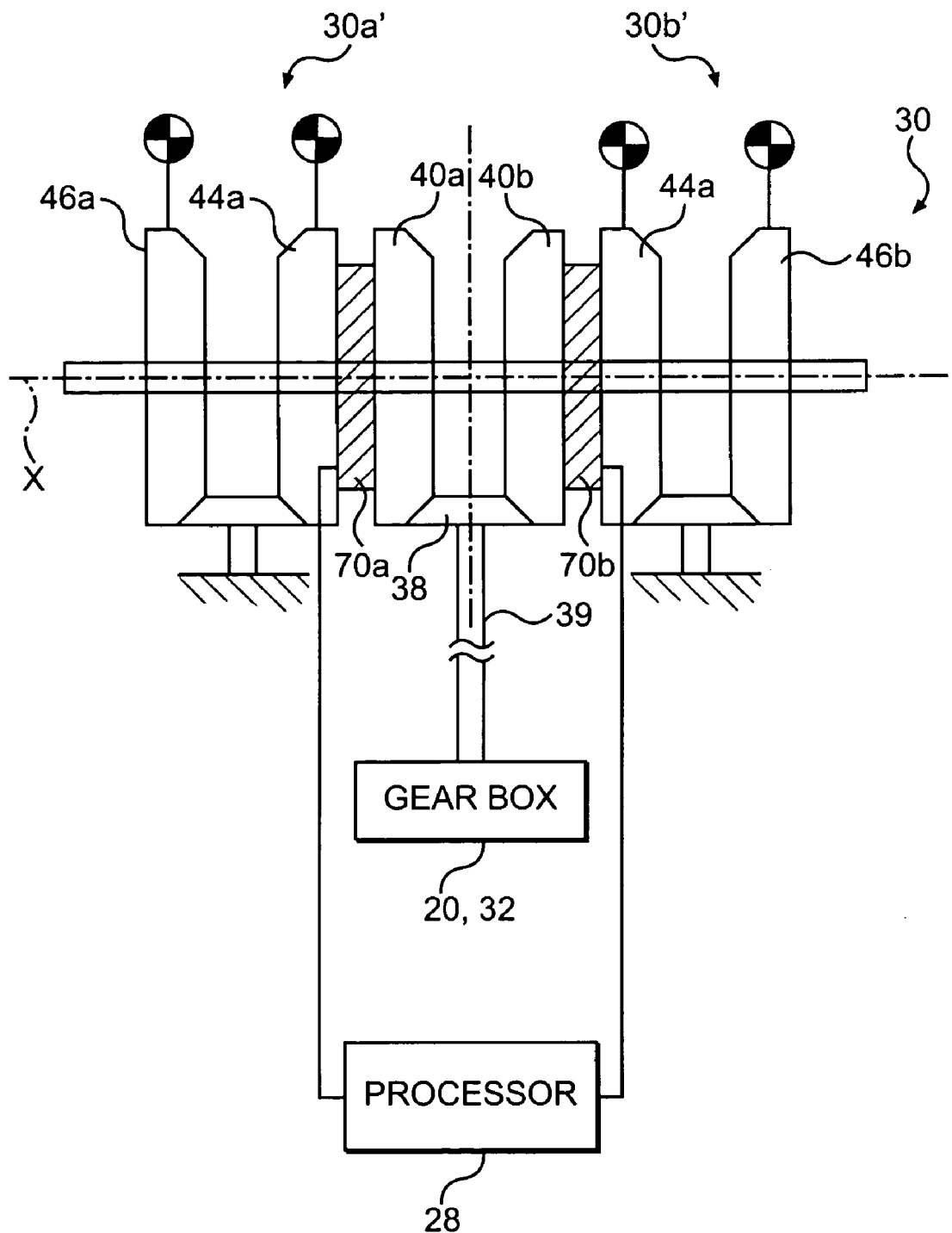
FIG. 6 is a general face view of an active vibration control system according to the present invention.

Referring to FIG. 6, another GMFG 30' according to the present invention is schematically illustrated. The GMFG 30' operates as described for GMFG 30 but replaces the differential assemblies 42a, 42b with clutch assemblies 70a, 70b (illustrated schematically). The clutch assemblies 70a, 70b are preferably magnetorheological clutches.

The clutch assemblies 70a, 70b provide commanded phase variations between the section 30a, 30b as described previously. The clutch assemblies 70a, 70b control relative rotation of the mass gears 44a, 46a of section 30a' and mass gears 44b, 46b of section 30b' to produce a commanded vibratory force. The clutch assemblies 70a, 70b are selectively released or engaged in response to the processor 28 (FIG. 1) and changing dynamic characteristics such that vibratory forces caused by the rotor assembly 12 and/or other vibratory sources are reduced or eliminated.

A simulation performed with six GMFGs as described herein mounted to a UH-60 gearbox showed a reduction in vibration to levels of 0.05 g.

It should be understood that relative positional terms such as "forward," "aft," "upper," "lower," "above," "below," and the like are with reference to the normal operational attitude of the vehicle and should not be considered otherwise limiting. It should also be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An active vibration control system comprising:
a first shaft defined along a first axis;
a first gear mounted to said first shaft;
an input shaft engaged with said first gear;
a second gear mounted to said first shaft;
a first mass mounted to said second gear;
a third gear mounted to said first shaft;
a second mass mounted to said third gear;
a fourth gear engaged with said second gear and said third gear such that said third gear and said second gear counter-rotate; and
a first differential assembly engaged with said first gear and said second gear to selectively adjust rotation of said first mass and said second mass relative said first gear to generate a first vibratory force output.

2. The active vibration control system as recited in claim 1, further comprising:
a fifth gear mounted to said first shaft;
a sixth gear mounted to said first shaft;
a third mass mounted to said sixth gear;
a seventh gear mounted to said first shaft;
a fourth mass mounted to said seventh gear;
an eight gear engaged with said sixth gear and said seventh gear such that said sixth gear and said seventh gear counter-rotate; and
a second differential assembly engaged with said fifth gear and said sixth gear to selectively adjust rotation of said third mass and said fourth mass relative said fifth gear to generate a second vibratory force output.

3. The active vibration control system as recited in claim 2, wherein said input shaft is engaged with said first gear and said fifth gear such that said first gear and said fifth gear counter-rotate.

4. The active vibration control system as recited in claim 1, wherein said differential assembly comprises:
a second shaft mounted perpendicular to said first shaft;
a differential gear mounted to said second shaft, said differential gear engaged with said first gear and said second gear.

5. The active vibration control system as recited in claim 4, further comprising a drive system to rotate said second shaft about said first shaft.

6. The active vibration control system as recited in claim 1, wherein said input shaft is driven by a helicopter engine-to-transmission gearbox.

7. The active vibration control system as recited in claim 1, wherein said input shaft drives a helicopter tail rotor.

8. An active vibration control system comprising:
a first shaft defined along a first axis;
a first gear mounted to said first shaft;
a second gear mounted to said first shaft;
a first mass mounted to said second gear;
a third gear mounted to said first shaft;
a second mass mounted to said third gear;
a fourth gear engaged with said second gear and said third gear such that said third gear and said second gear counter-rotate; and
a first differential assembly engaged with said first gear and said second gear to selectively adjust rotation of said first mass and said second mass relative said first gear to generate a first vibratory force output wherein said first differential assembly comprises a clutch.

9. An active vibration control system comprising:
a first shaft defined along a first axis;
a first gear mounted to said first shaft;
a second gear mounted to said first shaft;
a first mass mounted to said second gear;
a third gear mounted to said first shaft;
a second mass mounted to said third gear;
a fourth gear engaged with said second gear and said third gear such that said third gear and said second gear counter-rotate; and
a first differential assembly engaged with said first gear and said second gear to selectively adjust rotation or said first mass and said second mass relative said first gear to generate a first vibratory force output wherein said first differential assembly comprises a magnetorheological fluid clutch.

10. An active vibration control system comprising:
a helicopter transmission;
an engine-to-transmission gearbox which drives said helicopter transmission; and
a force generator mounted to said engine-to-transmission gearbox, said force generator mechanically driven by an input shaft rotated by said engine-to-transmission gearbox.

11. The active vibration control system as recited in claim 10, wherein said force generator is mechanically rotated by said input shaft.

12. The active vibration control system as recited in claim 10, wherein said force generator is directly driven by said input shaft.

13. An active vibration control system comprising:
a helicopter transmission;
an engine-to-transmission gearbox which drives said helicopter transmission; and
a force generator mounted to said engine-to-transmission gearbox, said force generator driven by an input shaft rotated by said engine-to-transmission gearbox;
a first shaft defined along a first axis;
a first gear mounted to said first shaft, said first gear driven by said input shaft;
a second gear mounted to said first shaft;
a first mass mounted to said second gear,
a third gear mounted to said first shaft;
a second mass mounted to said third gear;
a fourth gear engaged with said second gear and said third gear such that said third gear and said second gear counter-rotate; and
a first differential assembly engaged with said first gear and said second gear to selectively adjust rotation of said first mass and said second mass relative said first gear to generate a first vibratory force output.

14. An active vibration control system comprising:
a helicopter transmission;
an engine-to-transmission gearbox which drives said helicopter transmission; and
a force generator mounted to said engine-to-transmission gearbox, said force generator driven by an input shaft rotated by said engine-to-transmission gearbox; and
a second force generator mounted to said helicopter transmission, said second force generator driven by an output to a helicopter tail rotor.

15. An active vibration control system comprising:
a helicopter transmission; and
a force generator mounted to and mechanically driven by said helicopter transmission.

16. The active vibration control system as recited in claim 15, further comprising a second force generator mounted to said helicopter transmission, said second force generator mechanically driven by an output to a helicopter tail rotor.

17. The active vibration control system as recited in claim 15, further comprising:
an engine-to-transmission gearbox which drives said helicopter transmission; and
a second force generator mechanically driven by said engine-to-transmission gearbox.

18. The active vibration control system as recited in claim 15, wherein said force generator is mechanically rotated by a shaft driven by said helicopter transmission.

19. The active vibration control system as recited in claim 15, wherein said force generator is directly driven by a shaft driven by said helicopter transmission.

20. The active vibration control system as recited in claim 15, further comprising a plurality of sensors located adjacent an aircraft cabin, said plurality of sensor in communication with said force generator for operation of said force generator in response thereto.

21. The active vibration control system as recited in claim 15, wherein said force generator includes a shaft driven gearbox that is mechanically driven by a shaft rotated by said helicopter transmission.

22. The active vibration control system as recited in claim 15, wherein said force generator includes a shaft driven gearbox that is mechanically driven by a tail rotor driveshaft rotated by said helicopter transmission.

23. An active vibration control system comprising:
a helicopter transmission; and
a force generator mechanically driven by said helicopter transmission.

24. The active vibration control system as recited in claim 23, wherein said force generator is directly driven by a shaft driven by said helicopter transmission.

25. The active vibration control system as recited in claim 23, wherein said force generator is directly driven by a tail rotor driveshaft driven by said helicopter transmission.

26. The active vibration control system as recited in claim 23, wherein said force generator further comprises:
a first shaft defined along a first axis;
a first gear mounted to said first shaft;
a second gear mounted to said first shaft;
a second shaft mounted perpendicular to said first shaft, said first shaft mechanically driven by said helicopter transmission to rotate said second shaft about said first shaft; and
a differential gear mounted to said second shaft, said differential gear engaged with said first gear and said second gear to selectively, adjust rotation of a first mass and a second mass relative said first gear to generate a first vibratory force output.

* * * * *

UNITED STATES PATENT AND TRADEMARK OFFICE
CERTIFICATE OF CORRECTION

PATENT NO. : 7,118,328 B2 Page 1 of 1
APPLICATION NO. : 10/799982
DATED : October 10, 2006
INVENTOR(S) : Welsh et al.

It is certified that error appears in the above-identified patent and that said Letters Patent is hereby corrected as shown below:

Claim 9, Column 6, line 55: "or" should be --of--

Signed and Sealed this

Second Day of January, 2007

JON W. DUDAS
*Director of the United States Patent and Trademark Office*